(12) United States Patent
Onohara (10) Patent No.: US 8,720,942 B2
(45) Date of Patent: May 13, 2014

(54) STEERING WHEEL

(75) Inventor: Keisuke Onohara, Minato-ku (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/552,458

(22) Filed: Jul. 18, 2012

(65) Prior Publication Data
US 2013/0026741 A1 Jan. 31, 2013

(30) Foreign Application Priority Data

Jul. 27, 2011 (JP) .................................. 2011-164308

(51) Int. Cl.
*B60R 21/203* (2006.01)
*H01H 9/00* (2006.01)

(52) U.S. Cl.
USPC ........................... 280/731; 74/552; 200/61.55

(58) Field of Classification Search
USPC ........ 74/552, 553; 200/61.54, 61.55; 280/731
See application file for complete search history.

(56) References Cited

U.S. PATENT DOCUMENTS

| | | | | |
|---|---|---|---|---|
| 4,789,763 A * | 12/1988 | Nagata et al. | .............. | 200/61.54 |
| 5,023,412 A * | 6/1991 | Ishida | ......................... | 200/61.54 |
| 5,380,037 A * | 1/1995 | Worrell et al. | ............. | 280/728.2 |
| 5,871,234 A * | 2/1999 | Umemura et al. | ........... | 280/777 |
| 6,036,223 A * | 3/2000 | Worrell et al. | ................ | 280/731 |
| 6,062,592 A * | 5/2000 | Sakurai et al. | ............. | 280/728.2 |
| 6,572,138 B1 * | 6/2003 | Bohn et al. | .................... | 280/731 |
| 6,995,328 B2 * | 2/2006 | Sugimoto | .................. | 200/61.54 |
| 7,464,959 B2 * | 12/2008 | Pillsbury, IV et al. | ........ | 280/731 |
| 8,286,766 B2 * | 10/2012 | Terada et al. | ................. | 188/379 |
| 2009/0261560 A1 * | 10/2009 | Nakagawa et al. | ........... | 280/731 |
| 2010/0219621 A1 * | 9/2010 | Sasaki et al. | .................. | 280/731 |
| 2011/0120258 A1 * | 5/2011 | Kondo et al. | .................... | 74/552 |
| 2013/0239739 A1 * | 9/2013 | Miyahara et al. | .............. | 74/552 |

FOREIGN PATENT DOCUMENTS

| | | |
|---|---|---|
| JP | 2003-154943 | 5/2003 |
| JP | 2003-327131 | 11/2003 |
| JP | 2009-262785 | 11/2009 |
| JP | 2010-202085 | 9/2010 |
| JP | 2011-046352 | 3/2011 |
| JP | 2011-110941 | 6/2011 |

* cited by examiner

*Primary Examiner* — Ruth Ilan
*Assistant Examiner* — Laura Freedman
(74) *Attorney, Agent, or Firm* — Foley & Lardner LLP (57) ABSTRACT

Provided is a steering wheel in which, even in the case where a moving part of a horn switch exists in a space formed between a pad and a main body, harness can be prevented from getting caught in a gap. The steering wheel includes a first horn plate secured to the main body, a second horn plate secured to the pad, guide pins arranged vertically on the second horn plate and inserted through openings of the first horn plate, flange-shaped stoppers formed on the guide pins, an insulators disposed so as to be slidable along the guide pins, and coil springs that urge the insulators toward the stoppers. The insulator covers an outer periphery of the stopper and has a wall surface portion, the height of which is substantially equal to an offset distance between a fixed contact and a moving contact.

7 Claims, 9 Drawing Sheets

STEERING WHEEL

CROSS-REFERENCE TO RELATED APPLICATION

This application claims priority under 35 U.S.C. §119 to Japanese Patent Application No. JP2011-164308 filed on Jul. 27, 2011, the entire content of which is hereby incorporated herein by reference in its entirety.

FIELD OF THE INVENTION

The present invention relates to a steering wheel installed in a vehicle such as an automobile, and in particular, relates to a steering wheel comprising an insulator disposed in a sliding portion of a horn switch.

BACKGROUND OF THE INVENTION

Steering wheels used to steer vehicles such as automobiles including a main body attached to a steering shaft for converting rotational operation into steering operation and a pad disposed in a substantially central portion of the main body is known (for example, see Japanese Unexamined Patent Application Publication Nos. 2003-154943 and 2011-110941). In the steering wheel, the pad is attached to the main body such that the pad is movable in the axial direction of the steering shaft, and horn switches are configured between the main body and the pad.

A steering wheel shown in FIG. 3 of Japanese Unexamined Patent Application Publication No. 2003-154943 includes a main body (steering wheel main body), a pad (pad), fixed-side bases, moving-side bases, and horn switches. The pad is connected to the main body and has an airbag device, the fixed-side bases are connected to a metal core of the main body, the moving-side bases are formed on the pad side, and the horn switches are disposed between the fixed-side bases and the moving-side bases. Each horn switch includes fixed-side members, moving-side members, a spring as urging means, and a connection bolt. The fixed-side members include a fixed contact and are supported on the main body side. The moving-side members include a moving contact, which can operate a horn when contacting the fixed contact, and are disposed on the pad side above the fixed-side members. The spring is a coil spring that is disposed between the fixed-side members and the moving-side members and urges the moving contact upward so as to separate the moving contact from the fixed contact. The connection bolt connects the moving-side member side to the fixed-side member side so as to allow the moving-side members to move downward and define the offset distance between the fixed contact and the moving contact.

A steering wheel shown in FIG. 7 (D) of Japanese Unexamined Patent Application Publication No. 2011-110941 includes a first horn plate, a second horn plate, guide pins, stoppers, bushes (also referred to as insulators), elastic members, and coil springs. The first horn plate is secured to a main body, the second horn plate is secured to a pad, the guide pins arranged vertically on the second horn plate, the stoppers are formed at the tip ends of the guide pins, the bushes are inserted so as to be slidable along the guide pins, elastic members are engaged with the bushes and retain the first horn plate at outer peripheries thereof, and the guide pins are inserted into the coil springs such that the coil springs urge the bushes toward the stoppers.

The first horn plate corresponds to the fixed-side bases in Japanese Unexamined Patent Application Publication No. 2003-154943, the second horn plate corresponds to the moving-side bases in Japanese Unexamined Patent Application Publication No. 2003-154943, the guide pins and the stoppers correspond to the connection bolts in Japanese Unexamined Patent Application Publication No. 2003-154943, and the bushes correspond to the fixed-side members in Japanese Unexamined Patent Application Publication No. 2003-154943. In the following description, the bushes and the fixed-side members are generally referred to as insulators.

SUMMARY OF THE INVENTION

In the above-described steering wheels in Japanese Unexamined Patent Application Publication Nos. 2003-154943 and 2011-110941, the second horn plate (moving-side bases) moves up and down as the pad moves up and down, and accordingly, the guide pins and stoppers (connection bolts) secured to the second horn plate (moving-side bases) also move up and down. In contrast, the first horn plate (fixed-side bases) secured to the main body and the insulators retained at the first horn plate are not moved. Thus, when the pad is pressed down in order to sound the horn, a gap is formed between the stopper (head of the connection bolt) and the insulator by a distance by which the pad is pressed down (distance corresponding to the offset distance between the fixed contact and the moving contact).

In addition, the pad includes an airbag device and a harness. The airbag device includes an airbag to be inflated and deployed in an emergency situation and an inflator for supplying gas to the airbag. The harness is connected to the steering shaft side, and a firing signal is transmitted to the inflator through the harness. Due to a structure with which the pad is attached to the main body, the harness has a length of, for example, about 100 to 200 mm. After the pad has been attached to the main body, the harness is housed in a space formed between the pad and the main body. However, this space has a size of about only several millimeters to a few tens of millimeters. Thus, it is difficult to recognize a state in which the excess portion of the harness is housed in the space.

Thus, in the case where the moving parts (the stoppers or the heads of the connection bolts) of the horn switches exist in this space, there is a possibility of the harness getting caught in the gap between the stopper (the head of the connection bolt) and the insulator, the gap being formed when the horn is sounded. When the harness gets caught in this gap, the harness would be damaged or the horn switch could not be operated.

The present invention has been developed in view of the above-described problems. The object of the present invention is to provide a steering wheel in which, even in the case where a moving part of a horn switch exists in a space formed between a pad and a main body, a harness can be prevented from getting caught in a gap.

According to the present invention, a steering wheel is provided. The steering wheel includes a main body attached to a steering shaft for converting a rotational operation into a steering operation and a pad disposed in a substantially central portion of the main body. In the steering wheel, the pad is attached to the main body such that the pad is movable in the axial direction of the steering shaft, and each horn switch is configured between a fixed contact disposed on the main body side and a moving contact disposed on the pad side. The steering wheel also includes a first horn plate secured to the main body, a second horn plate secured to the pad, guide pins arranged vertically on the second horn plate and inserted through openings of the first horn plate, flange-shaped stoppers formed on the guide pins, insulators retained in the openings of the first horn plate and disposed so as to be slidable along the guide pins, and coil springs disposed between the second horn plate and the insulators and urge the insulators toward the stoppers. In the steering wheel, each of the insulators has a wall surface portion that covers an outer periphery of the stopper and has a height substantially equal to an offset distance between the fixed contact and the moving contact.

Preferably, the pad includes an airbag device including an airbag to be inflated and deployed in an emergency situation and an inflator for supplying gas to the airbag, and a harness connected to the steering shaft side. A firing signal is transmitted to the inflator through the harness. The wall surface portion is formed to have a height with which the harness does not get caught in a gap between the stopper and the insulator and pinched therebetween. The wall surface portion may have a plurality of lightening holes each having a size or a shape at or with which the harness does not enter the gap.

Preferably, the insulator includes an elastic member engaged with an outer periphery of the insulator and a protector engaged with an outer periphery of the elastic member and retained at the first horn plate. The insulator also includes a first flange portion disposed between the stopper and the elastic member and a second flange portion disposed between the coil spring and the elastic member. The elastic member has a first diameter enlarged portion, a diameter of which is enlarged so that the elastic member can contact the first flange portion, and a second diameter enlarged portion, a diameter of which is enlarged so that the elastic member can contact the second flange portion. A plurality of linear protrusions are substantially radially formed on a surface of the first flange portion in contact with the first diameter enlarged portion. The term "diameter enlarged" refers to a radially enlarged state.

Preferably, the insulator is divided into a first insulator and a second insulator. The first insulator has the first flange portion and a first leg portion extending from the first flange portion toward the second flange portion and disposed along the guide pin. The second insulator has the second flange portion and second leg portions extending from the second flange portion toward the first flange portion and disposed along the guide pin.

Preferably, a gap having a size at least twice as large as a thickness of the first horn plate is formed between the first horn plate and the stopper. The insulator, the entirety of which may be formed of synthetic resin as an integral unit, may have a thickness with which most of the gap is occupied.

Preferably, the gap is a gap in which an insulator with a damping function having an elastic member can be mounted. Furthermore, the insulator may have substantially the same external shape as that of the insulator with a damping function.

In the steering wheel according to the above-described present invention, the insulator has the wall surface portion that covers the outer periphery of the stopper and has the height substantially equal to the offset distance between the fixed contact and the moving contact. Thus, even in the case where a moving part of the horn switch exists in a space formed between the pad and the main body, and a gap is formed between the stopper and the insulator when the horn switch is operated to sound a horn, the gap is not exposed to the space, thereby preventing the harness from getting caught in the gap.

The harness can be effectively prevented from getting caught in the gap by setting the height of the wall surface portion to such a height that, when the horn switch is operated to sound the horn, the harness does not get caught in the gap, that is, to such a height that the gap formed between the stopper and the insulator is not exposed at all, or even if exposed, the size of the gap is sufficiently small relative to the thickness of the harness.

The lightening holes formed in the wall surface portion can minimize an increase in the weight of the insulator due to formation of the wall surface portion.

With the elastic member and the protector disposed in the insulator, a dynamic damper can be configured so that the natural frequency of the pad as a mass body is adjusted to cancel and damp a vibration transferred from the main body by the sympathetic vibration of the pad. Additionally, a load applied to and wear on the elastic member can be reduced, thereby allowing the life of the dynamic damper to be extended. Furthermore, with the linear protrusions formed on the surface of the insulator in contact with the elastic member, a frictional force can be effectively generated between the insulator and the elastic member and the magnitude of the frictional force generated between the insulator and the elastic member can be easily adjusted. Thus, the frequency of the dynamic damper can be easily adjusted.

By dividing the insulator into the first insulator and the second insulator, the insulator can be easily assembled. In addition, a load applied to the elastic member can be reduced also by bringing the leg portion of the second insulator in contact with the stopper.

By providing a sufficient gap between the first horn plate and the stopper, the insulator with a damping function, the thickness of which tends to increase, to be disposed between the first horn plate and the stopper can be mounted in the gap. By forming the synthetic-resin insulator formed to have the thickness with which most of the gap is occupied, the insulator with a damping function can be replaced with that without a damping function without changing the shapes and the like of the surrounding components (for example, the shape of the fixing hole of the horn plate, the shape and tightening amount of the guide pin, the shape and spring constant of the coil spring, etc.). Thus, the number of components and man-hours for management can be reduced, thereby allowing the cost to be reduced.

By forming the gap in advance to fit the shape of the insulator with a damping function to be mounted therein, the insulator according to the present invention can be easily replaced with that with a damping function.

By forming the insulator to have an external shape substantially the same as that of the insulator with a damping function, the same structure as that for the insulator with a damping function can be used for securing the insulator to the horn plate, thus facilitating replacement of the insulator.

BRIEF DESCRIPTION OF THE DRAWINGS

FIG. 2 shows enlarged views of a support structure of one of horn switches shown in FIG. 1, wherein

FIG. 3 shows detailed views of one of first insulators shown in FIG. 1, wherein

FIG. 4 shows detailed views of one of second insulators shown in FIG. 1, wherein

FIG. 5 shows detailed views of one of elastic members shown in FIG. 1, wherein

FIG. 6 shows detailed views of one of protectors shown in FIG. 1, wherein

FIG. 8 shows enlarged views of parts of the steering wheels according to the other embodiments of the present invention, wherein

FIG. 9 shows external views of the insulator shown in FIG. 8A, wherein

DETAILED DESCRIPTION OF THE PREFERRED EMBODIMENTS

Figure 1:
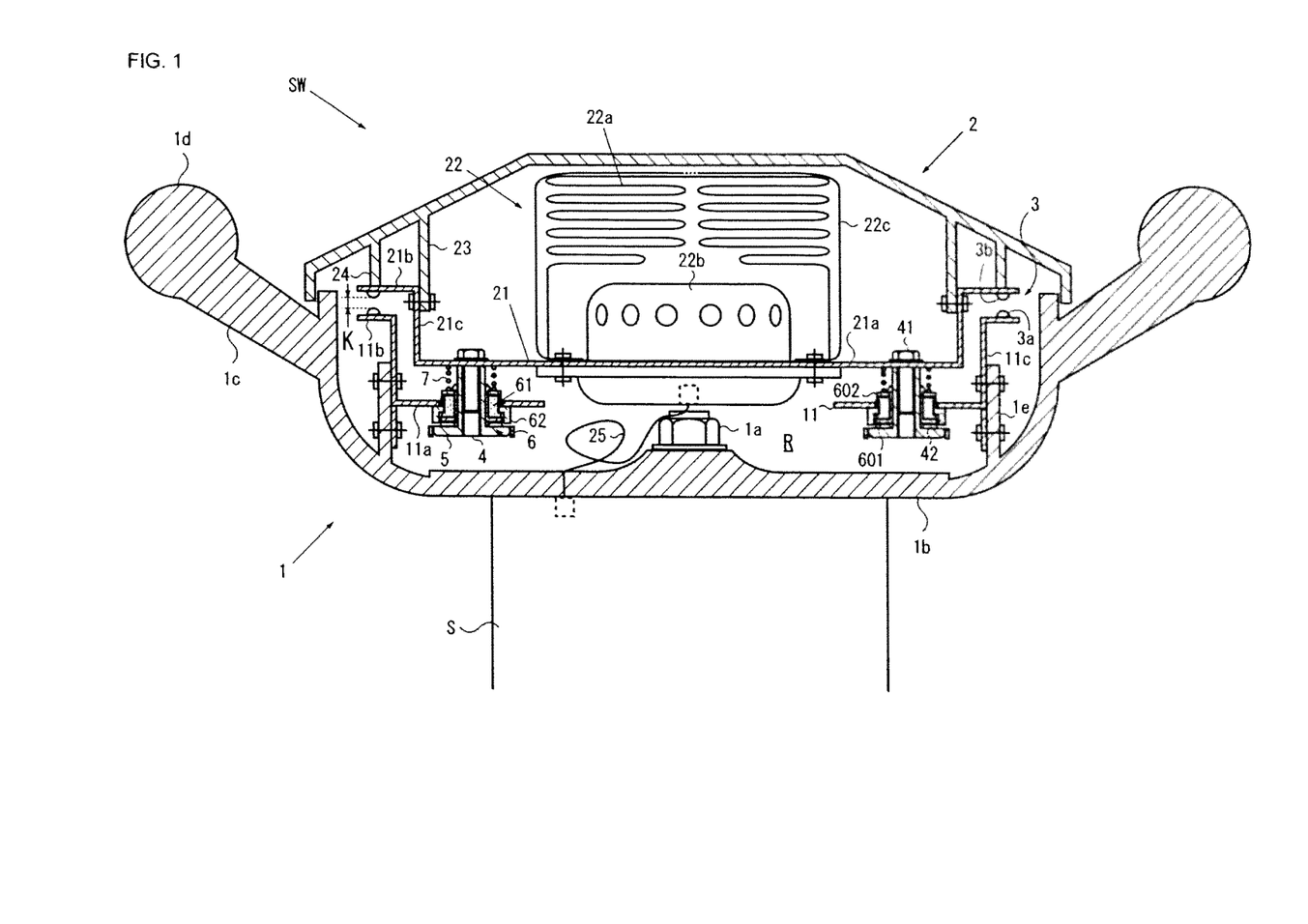
FIG. 1 shows a sectional view of a steering wheel according to a first embodiment of the present invention.
Figure 2A:
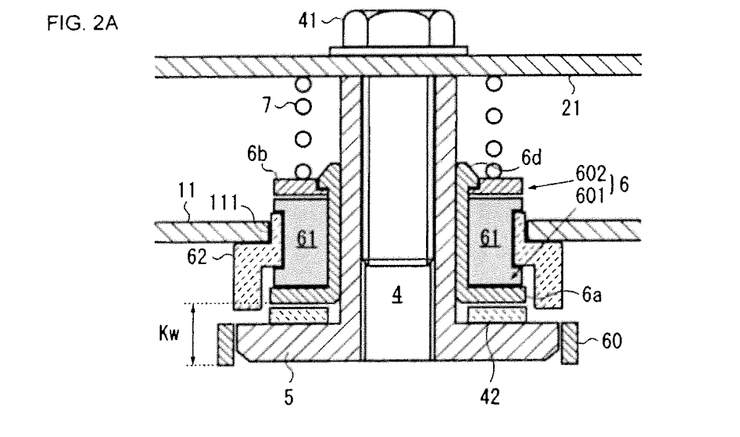
FIG. 2A shows a normal state.
Figure 2B:
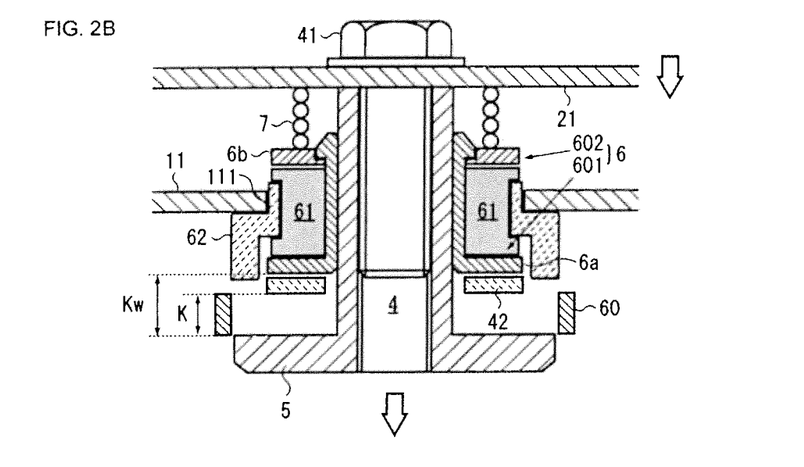
FIG. 2B shows a state where a horn is sounded.
Figure 3A:
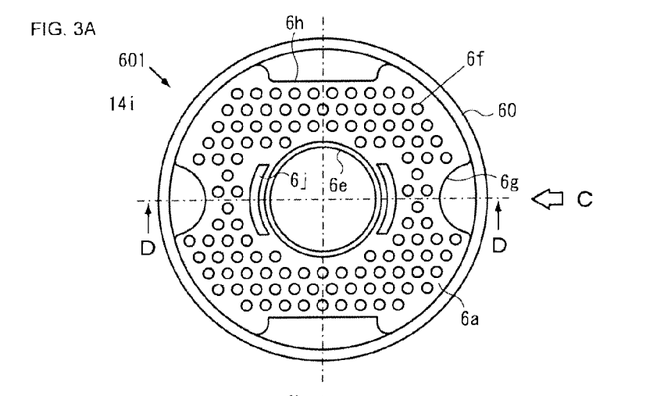
FIG. 3A shows a plan view.
Figure 3B:
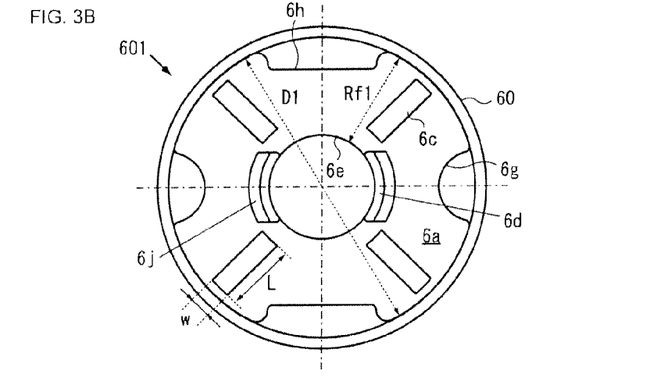
FIG. 3B shows a rear view.
Figure 3C:
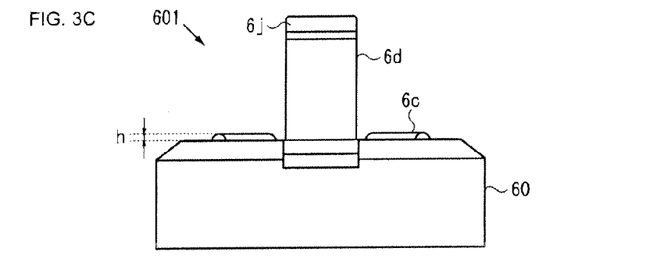
FIG. 3C shows a view in the direction of arrow C in FIG. 3A.
Figure 3D:
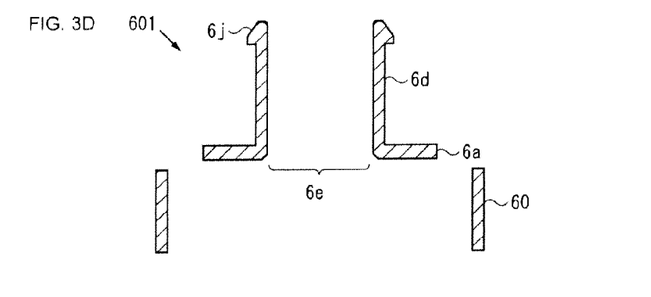
FIG. 3D shows a sectional view taken along line D-D in FIG. 3A.
Figure 4A:
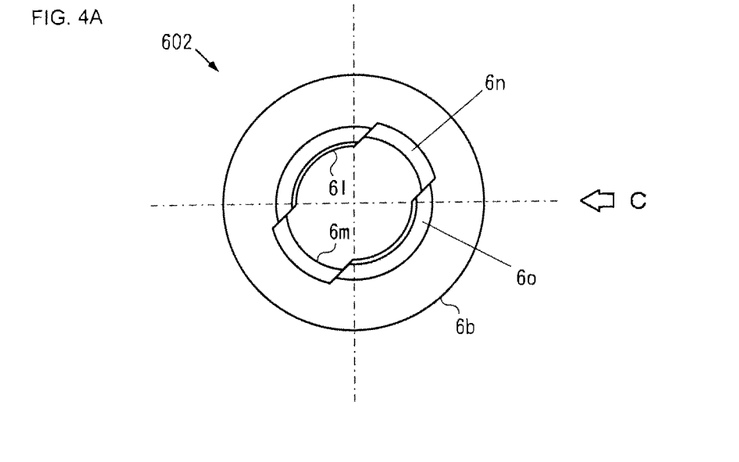
FIG. 4A shows a plan view.
Figure 4B:
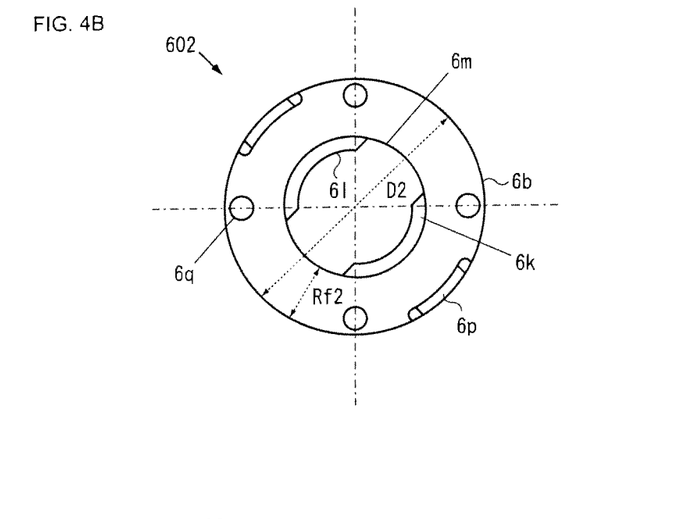
FIG. 4B shows a rear view.
Figure 4C:
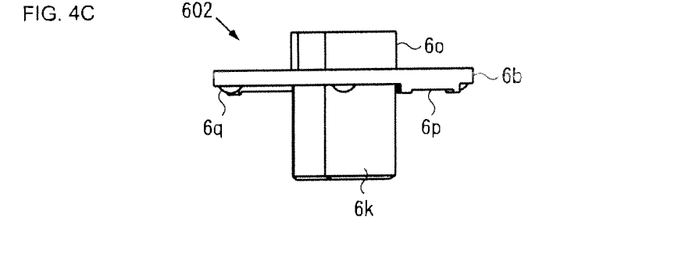
FIG. 4C shows a view in the direction of arrow C in FIG. 4A.
Figure 5A:
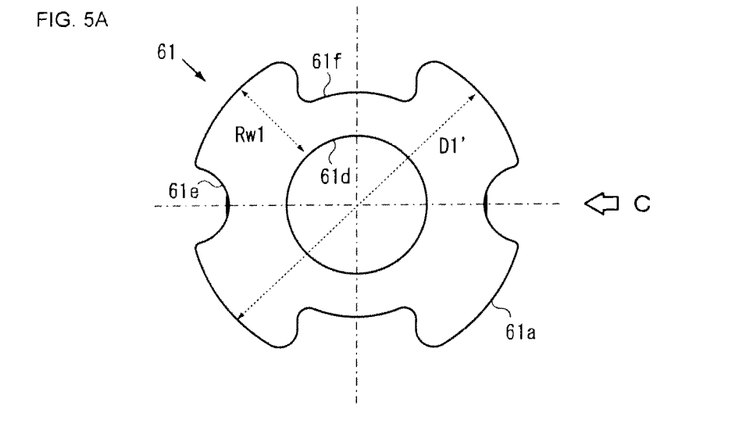
FIG. 5A shows a plan view.
Figure 5B:
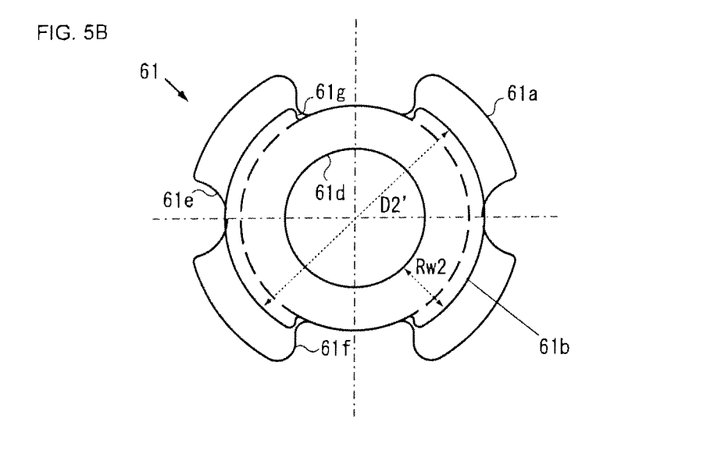
FIG. 5B shows a rear view.
Figure 5C:
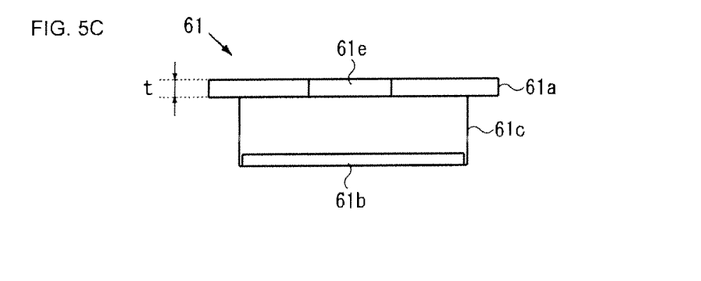
FIG. 5C shows a view in the direction of arrow C in FIG. 5A.
Figure 6A:
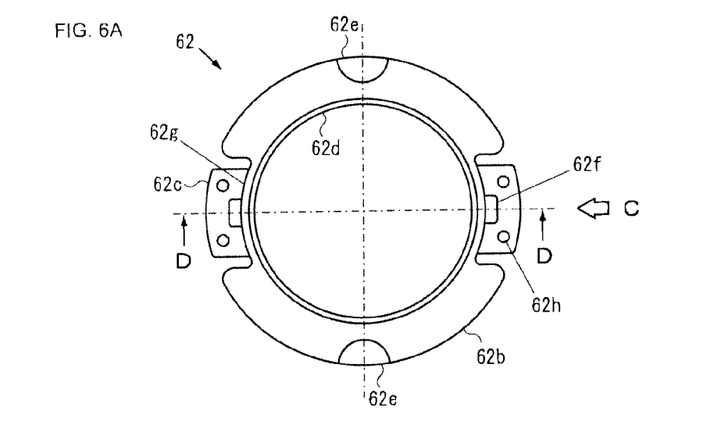
FIG. 6A shows a plan view.
Figure 6B:
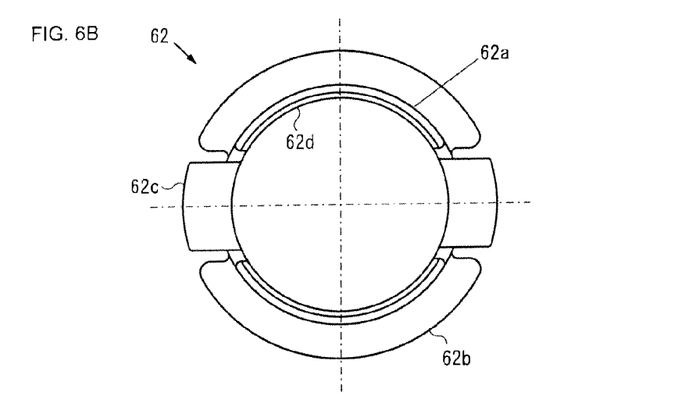
FIG. 6B shows a rear view.
Figure 6C:
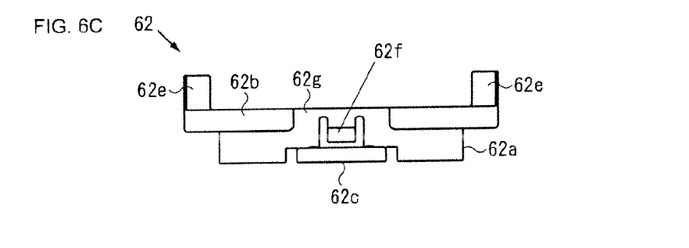
FIG. 6C shows a view in the direction of arrow C in FIG. 6A.
Figure 6D:
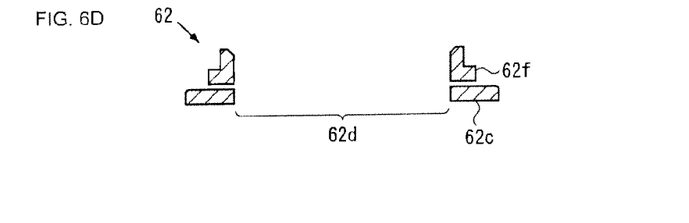
FIG. 6D shows a sectional view taken along line D-D in FIG. 6A.

Embodiments of the present invention will be described below with reference to FIGS. 1-9. FIG. 1 shows a sectional view of a steering wheel according to a first embodiment of the present invention. FIG. 2 shows enlarged views of a support structure of one of horn switches shown in FIG. 1, wherein FIG. 2A shows a normal state, and FIG. 2B shows a state where a horn is sounded. FIG. 3 shows detailed views of one of first insulators shown in FIG. 1, wherein FIG. 3A shows a plan view, FIG. 3B shows a rear view, FIG. 3C shows a view in the direction of arrow C in FIG. 3A, and FIG. 3D shows a sectional view taken along line D-D in FIG. 3A. FIG. 4 shows detailed views of one of second insulators shown in FIG. 1, wherein FIG. 4A shows a plan view, FIG. 4B shows a rear view, and FIG. 4C shows a view in the direction of arrow C in FIG. 4A. FIG. 5 shows detailed views of one of elastic members shown in FIG. 1, wherein FIG. 5A shows a plan view, FIG. 5B shows a rear view, and FIG. 5C shows a view in the direction of arrow C in FIG. 5A. FIG. 6 shows detailed views of one of protectors shown in FIG. 1, wherein FIG. 6A shows a plan view, FIG. 6B shows a rear view, FIG. 6C shows a view in the direction of arrow C in FIG. 6A, and FIG. 6D shows a sectional view taken along line D-D in FIG. 6A.

As shown in FIGS. 1-6, a steering wheel SW according to the first embodiment of the present invention includes a main body 1 attached to a steering shaft S for converting rotational operation into steering operation and a pad 2 disposed in a substantially central portion of the main body 1. In the steering wheel SW, the pad 2 is attached to the main body 1 such that the pad 2 is movable in the axial direction of the steering shaft S, and horn switches 3 are each configured between a fixed contact 3a on the main body 1 side and a moving contact 3b on the pad 2 side. The steering wheel SW includes a first horn plate 11 secured to the main body 1, a second horn plate 21 secured to the pad 2, guide pins 4 arranged vertically on the second horn plate 21 and are inserted through a corresponding one of openings 111 of the first horn plate 11, flange-shaped stoppers 5 formed on the guide pins 4, insulators 6 retained in the corresponding openings 111 of the first horn plate 11 and disposed so as to be slidable along the corresponding guide pins 4, and coil springs 7 disposed between the second horn plate 21 and the insulators 6 and urge the insulators 6 toward the stoppers 5. Each of the insulators 6 covers an outer periphery of the corresponding stopper 5 and has a wall surface portion 60, the height Kw substantially equal to an offset distance K between the fixed contact 3a and the moving contact 3b.

As shown in FIG. 1, the main body 1 includes a boss 1b secured to the steering shaft S with a securing device 1a, a plurality of spokes 1c radially extending from the boss 1b, and an annular rim 1d connected to the spokes 1c. The main body 1 has wall surface portions 1e formed on an inner side thereof. The first horn plate 11 is secured to the wall surface portions 1e. The structure of the main body 1 is generally similar to that of the related art, and is not limited to the structure shown in FIG. 1.

As shown in FIG. 1, the pad 2 is disposed in a substantially central portion of the steering wheel SW and houses an airbag device 22. The airbag device 22 includes an airbag 22a to be inflated and deployed in an emergency situation and an inflator 22b for supplying gas to the airbag 22a. The pad 2 is generally formed by resin molding, and is configured so as to tear at a thin portion formed in a rear surface of the pad 2 when the airbag 22a is inflated and deployed. The pad 2 has wall surface portions 23, to which the second horn plate 21 is secured, and a support part 24 in contact with the second horn plate 21. In addition, the inflator 22b is secured to a substantially central portion of the second horn plate 21 secured to the pad 2. The airbag 22a is secured to the second horn plate 21 together with the inflator 22b and folded and housed in the pad 2. The airbag 22a may be wrapped with a wrapping sheet 22c. The second horn plate 21 is not necessarily an independent component. The second horn plate 21 may be part of a retainer that retains the inflator 22b.

The pad 2 includes a harness 25 that is connected to the steering shaft S side and allows a firing signal to be transmitted to the inflator 22b therethrough. Due to a structure with which the pad 2 is attached to the main body 1, the harness 25 has a length of, for example, about 100 to 200 mm. After the pad 2 has been attached to the main body 1, the harness 25 is housed in a space R formed between the pad 2 and the main body 1.

As shown in FIG. 1, the first horn plate 11 has first flat surface portions 11a, second flat surface portions 11b, and step portions 11c connecting the first surface portions 11a and the second flat surface portions 11b. The guide pins 4 are inserted through the first flat surface portions 11a. The fixed contacts 3a of the horn switches 3 are disposed on the second flat surface portions 11b. The first horn plate 11 is secured to the wall surface portions 1e of the main body 1 with securing devices such as rivets. Each first flat surface portion 11a and the corresponding second flat surface portion 11b may be integrally formed of a single plate material or formed of separate plate materials. That is, the fixed contacts 3a may be each formed on the first horn plate 11 or connected to the main body 1 as a separate individual component.

As shown in FIG. 1, the second horn plate 21 has a first flat surface portion 21a, second flat surface portions 21b, and side surface portions 21c connecting the first flat surface portion 21a and the second flat surface portions 21b. The inflator 22b is secured to the first flat surface portion 21a. The guide pins 4 are arranged vertically on the first flat surface portion 21a. The moving contacts 3b of the horn switches 3 are disposed on the second flat surface portions 21b. The side surface portions 21c are secured to the wall surface portions 23 of the pad 2 with securing devices such as rivets. The first flat surface portion 21a and the second flat surface portions 21b may be integrally formed of a single plate material or formed of separate plate materials. That is, the moving contacts 3b may be formed on the second horn plate 21 or may be each connected to the pad 2 as a separate individual component.

The above-described main body 1 and the pad 2 form so-called dynamic dampers using support structures of the horn switches 3 including the guide pins 4, the stoppers 5, the insulators 6, and the coil springs 7. The main body 1 and the pad 2 are configured so that they can move relatively to each other in the axial direction of the steering shaft S and can be insulated from each other. This displacement of the main body 1 and the pad 2 relative to each other brings the fixed contacts 3a and the respective moving contacts 3b into contact with each other. Thus, the horn switch 3 causes the horn to be sounded. The support structure will be described in detail below with reference to FIGS. 2-6.

As shown in FIG. 2A, each guide pin 4 is formed integrally with the stopper 5 to have a nut-like shape. A securing member 41 such as a bolt is threaded to clamp the second horn plate 21 from the other side, securing the guide pin 4 to the second horn plate 21. The stopper 5 is formed integrally at a position, for example, near a tip end of the guide pin 4 and has a flange portion, the diameter of which is enlarged compared to that of the guide pin 4. The stopper 5 and the guide pin 4 are not necessarily integrated into a unit and may be formed as individual components separated from each other. The stopper 5 is used to position the insulator 6 in a normal state of the horn switch 3 (other than a state where the horn is sounded) and to prevent the insulator 6 from disengagement. A washer 42 or the like may be disposed between the stopper 5 and the insulator 6.

The insulator 6 is a component that slides along the guide pin 4. More specifically, as shown in FIGS. 2A, 3, and 5, the insulator 6 includes an elastic member 61 engaged with an outer periphery of the insulator 6 and a protector 62 engaged with an outer periphery of the elastic member 61 and retained at the first horn plate 11. The insulator 6 also includes a first flange portion 6a disposed between the stopper 5 and the elastic member 61 and a second flange portion 6b disposed between the coil spring 7 and the elastic member 61. The elastic member 61 has a first diameter enlarged portion 61a, a diameter of which is enlarged so that the elastic member 61 can contact the first flange portion 6a, and a second diameter enlarged portion 61b, a diameter of which is enlarged so that the elastic member 61 can contact the second flange portion 6b. A plurality of linear protrusions 6c are substantially radially formed on a surface of the first flange portion 6a in contact with the first diameter enlarged portion 61a.

The insulator 6 holds the elastic member 61 between the first flange portion 6a and the second flange portion 6b. The insulator 6 may be an integrally molded component having the first flange portion 6a and the second flange portion 6b, or an assembled component made of a plurality of subcomponents. The insulator 6 shown in FIG. 2A is divided into a first insulator 601 and a second insulator 602. The first insulator 601 has the first flange portion 6a and first leg portions 6d extending from the first flange portion 6a toward the second flange portion 6b and disposed along the guide pin 4. The second insulator 602 has the second flange portion 6b and second leg portions 6k extending from the second flange portion 6b toward the first flange portion 6a and disposed along the guide pin 4.

As shown in FIGS. 3A-3D, the first insulator 601 has the first flange portion 6a and the first leg portions 6d. An opening 6e, through which the guide pin 4 is inserted, is formed in a central portion of the first insulator 601. The wall surface portion 60, which has a height of Kw and covers the outer periphery of the stopper 5, is provided around the peripheral edge of the first flange portion 6a of the first insulator 601. That is, the wall surface portion 60 is arranged vertically toward a front surface side (opposite to a side where the first leg portions 6d are disposed) of the first flange portion 6a.

As shown in FIG. 3A, a plurality of irregularities 6f are formed on the front surface of the first flange portion 6a on the stopper 5 side. Although the plurality of irregularities 6f are formed of a plurality of circular recesses, the irregularities 6f are not limited to these. The irregularities 6f may be formed of circular protrusions, grid-like protrusions or recesses, mesh-like protrusions or recesses, parallel linear protrusions or recesses, a plurality of point-like protrusions or recesses arranged in an array, a plurality of arbitrarily scattered point-like protrusions or recesses, or the like. By forming such irregularities 6f, the first flange portion 6a can be prevented from adhering to the guide pin 4, the washer 42, or the like, thereby reducing abnormal noise and damage to the insulator 6.

In addition, the first flange portion 6a of the first insulator 601 has recesses 6g at its peripheral edge. The recesses 6g are engageable with cylindrical protrusions 62e (see FIG. 6) of the protector 62. By forming the recesses 6g, the protector 62 and the first insulator 601 can be engaged with each other in a circumferential direction to prevent rotation of the first insulator 601 (that is, the insulator 6), thereby reducing wear on the insulator 6 and the elastic member 61.

The first flange portion 6a of the first insulator 601 has notches 6h at its peripheral edge. Claws 62f (see FIG. 6) of the protector 62 retained at the first horn plate 11 are visible through the notches 6h in planar view. By forming the notches 6h, state of assembly of the support structure (dynamic damper) of the horn switch 3 can be easily checked.

As shown in FIG. 3B, the plurality of linear protrusions 6c are formed on the rear surface of the first flange portion 6a. Although the linear protrusions 6c are radially formed in portions, for example, where the diameter of the first flange portion 6a becomes the maximum diameter D1, arrangement of the linear protrusions 6c is not limited to that shown in FIG. 3B. Shorter linear protrusions may be added to other portions of the rear surface of the first flange portion 6a, or some of the linear protrusions 6c are not necessarily arranged in radial directions. The first flange portion 6a has a radial width Rf1 in portions where the diameter thereof becomes the maximum diameter D1.

As shown in FIGS. 3B and 3C, each linear protrusion 6c is a substantially semi-circular in cross-section having a length of L, a width of w and a height of h. By adequately adjusting the number of linear protrusions 6c, and the length L, the width w, and the height h of each linear protrusion 6c, the linear protrusions 6c are configured to bite the elastic member 61 in order to generate a desirable frictional force. By adjusting the frictional force, an amplitude or a frequency generated by vibration of the pad 2 can be arbitrarily adjusted. The radial width Rf1 of the first flange portion 6a may be adjusted in accordance with the required width L of the linear protrusion 6c. The width w of the linear protrusion 6c is not necessarily uniform through the length L. The width w may be set so as to radially gradually increase or decrease toward the outer directions, or become the maximum at an intermediate portion of the linear protrusion 6c.

As shown in FIGS. 3B-3D, the first leg portions 6d are arranged vertically at portions of a peripheral edge of the opening 6e and have respective claws 6j at the tip ends. The claws 6j can be retained at the second insulator 602. Although two first leg portions 6d are shown here, three or more first leg portions 6d may be provided. The first leg portions 6d are combined with the second leg portions 6k of the second insulator 602, which will be described later, so as to form a substantially cylindrical portion disposed along the guide pin 4.

As shown in FIGS. 4A-4C, the second insulator 602 has the second flange portion 6b and the second leg portions 6k. An opening 61, through which the guide pin 4 is inserted, is formed in a central portion of the second insulator 602.

As shown in FIGS. 4A and 4B, receiving portions 6m, through which the first leg portions 6d of the first insulator 601 can be inserted, are formed at a peripheral edge of the opening 61 of the second flange portion 6b. By inserting the first leg portions 6d of the first insulator 601 through the receiving portions 6m so as to combine the first insulator 601 with the second insulator 602, the substantially cylindrical portion slidable along the guide pin 4 can be formed. A recess 6n for receiving the claw 6j of the first leg portion 6d is formed at the edge of each receiving portion 6m. As described above, by disposing retaining portions of the claws 6j at positions recessed from a surface of the second flange portion 6b, the retaining portions of the claws 6j can be prevented from contacting the coil spring 7.

As shown in FIGS. 4A and 4C, on the surface of the second flange portion 6b on the coil spring 7 side, spring guides 6o are arranged vertically along the peripheral edge of the opening 61. The coil spring 7 is attached to the second flange portion 6b at outer peripheries of the spring guides 6o. The spring guides 6o have an outer diameter which is, for example, equal to or slightly larger than an inner diameter of the coil spring 7. Thus, the spring guides 6o are pushed into the coil spring 7, thereby retaining the coil spring 7 at the spring guides 6o.

As shown in FIGS. 4B and 4C, the second leg portions 6k are formed along the opening 61 of the second flange portion 6b. Although two second leg portions 6k are shown here, three or more second leg portions 6k may be formed.

Stopper walls 6p, which can contact a surface of the protector 62, may be formed at peripheral edge on a surface of the second flange portion 6b on the elastic member 61 side. When the elastic member 61 is pressed between the second flange portion 6b and the protector 62, the stopper walls 6p comes into contact with the surface of the protector 62 so as to ensure that a certain size of a gap is formed, thereby preventing a load equal to or greater than a specified value from being applied to the elastic member 61. The stopper walls 6p may each have a structure in which a surface of the stopper wall 6p on a side in contact with the protector 62 has a step, so that part of the stopper wall 6p contacts the protector 62.

A plurality of point-shaped protrusions 6q are formed on the surface of the second flange portion 6b contacting the elastic member 61 (second diameter enlarged portion 61b) side. Due to formation of such point-shaped protrusions 6q, a frictional force can be generated between the second flange portion 6b of the insulator 6 and the elastic member 61. This can assist the frictional force generated in the first flange portion 6a. Four point-shaped protrusions 6q are formed. However, arrangement and the shape of the point-shaped protrusions 6q are not limited to those shown in FIGS. 4B and 4C. The number of point-shaped protrusions 6q and the locations, diameter size, and the like of the point-shaped protrusions 6q may be arbitrarily set.

As shown in FIG. 4B, the second flange portion 6b has a disc-like shape having a diameter of D2. The diameter D2 is set so as to be smaller than the maximum diameter D1 of the first flange portion 6a. The second flange portion 6b has a radial width Rf2 in portions where the diameter thereof becomes the maximum diameter D2. Thus, the radial width Rf1 of the first flange portion 6a is set to have portions having a size larger than that of the radial width Rf2 of the second flange portion 6b (for example, the portions where the diameter thereof becomes the maximum diameter D1). With this structure, it can be ensured that an area on the first flange portion 6a side, the area being an area greatly affecting damping performance, is set to be large, thereby allowing a required frictional force to be generated between the insulator 6 and the elastic member 61. The radial width Rf1 of the first flange portion 6a is set to be, for example, equal to or greater than 1.5 times the radial width Rf2 of the second flange portion 6b, and preferably, set to be in a range from 1.5 to 2.0 times or 1.5 to 3.0 times the radial width Rf2. The upper limit of the radial width Rf1 (or the maximum diameter D1) of the first flange portion 6a is determined in accordance with the shape and size of the first horn plate 11, in which the first insulator 601 is disposed.

As shown in FIG. 2A, the elastic member 61 is a molded rubber component fitted between the first flange portion 6a and the second flange portion 6b of the insulator 6, which includes the first insulator 601 and the second insulator 602.

As shown in FIGS. 5A-5C, the elastic member 61 has a substantially cylindrical flat shape and has a substantially cylindrical barrel portion 61c, the first diameter enlarged portion 61a, and the second diameter enlarged portion 61b. The first diameter enlarged portion 61a is formed at an end of the barrel portion 61c on the first flange portion 6a side. The second diameter enlarged portion 61b is formed at the other end of the barrel portion 61c on the second flange portion 6b side. An opening 61d is formed in a central portion of the elastic member 61. The opening 61d allows the first and second leg portions 6d and 6k of the insulator 6 to be inserted therethrough.

As shown in FIG. 5A, the first diameter enlarged portion 61a has recesses 61e at its peripheral edge. The recesses 61e are engageable with the cylindrical protrusions 62e (see FIG. 6) of the protector 62. The recesses 61e each has the same shape as that of, for example, the recess 6g formed in the first flange portion 6a of the first insulator 601. Due to formation of the recesses 61e, the protector 62 and the elastic member 61 can be engaged with each other in a circumferential direction to prevent rotation of the elastic member 61, thereby reducing wear on the elastic member 61.

The first diameter enlarged portion 61a has notches 61f at a peripheral edge thereof. The claws 62f (see FIG. 6) of the protector 62 retained at the first horn plate 11 are visible through the notches 61f in plan view. The notches 61f each has the same shape as that of, for example, the notch 6h formed in the first flange portion 6a of the first insulator 601. Due to formation of such notches 61f, the assembled state of the support structure (dynamic damper) of the horn switch 3 can be easily checked.

The diameter of the first diameter enlarged portion 61a is the maximum diameter D1' in portions where neither the recesses 61e nor the notches 61f are formed. The maximum diameter D1' is set to be substantially equal to the maximum diameter D1 of the first flange portion 6a of the first insulator 601. That is, the first flange portion 6a of the first insulator 601 and the first diameter enlarged portion 61a of the elastic member 61 have substantially the same shapes and are positioned using the claws 62f of the protector 62 such that the shapes of the first flange portion 6a and the first diameter enlarged portion 61a match with each other.

As shown in FIG. 5B, the second diameter enlarged portion 61b has notches 61g at a peripheral edge thereof at positions corresponding to those of the notches 61f of the first diameter enlarged portion 61a. The stopper walls 6p formed on the second flange portion 6b are disposed in the notches 61g, thereby allowing the stopper walls 6p to contact the protector 62.

The diameter of the second diameter enlarged portion 61b is the maximum diameter D2' in portions where the notches 61g are not formed. The maximum diameter D2' is set to be substantially equal to that of the maximum diameter D2 of the second flange portion 6b of the second insulator 602. That is, the second flange portion 6b of the second insulator 602 has substantially the same shape as that of the second diameter enlarged portion 61b of the elastic member 61.

The first diameter enlarged portion 61a has a radial width Rw1 in portions where the diameter thereof is the maximum diameter D1'. The second diameter enlarged portion 61b has a radial width Rw2 in portions where the diameter thereof is the maximum diameter D2'. The radial width Rw1 is substantially equal to the radial width Rf1 of the first flange portion 6a, and the radial width Rw2 is substantially equal to the radial width Rf2 of the second flange portion 6b. Thus, part of the radial width Rw1 of the first diameter enlarged portion 61a is larger than the radial width Rw2 of the second diameter enlarged portion 61b.

The size of the radial width Rw1 of the first diameter enlarged portion 61a is set so as to increase or decrease an area in which the linear protrusions 6c formed on the first flange portion 6a and the elastic member 61 contact each other, thereby allowing a desirable frictional force to be generated. Thus, by adjusting the radial width Rw1 of the first diameter enlarged portion 61a, an amplitude or a frequency generated by vibration of the pad 2 can be arbitrarily adjusted.

As shown in FIG. 5C, the first diameter enlarged portion 61a has a thickness t. The first diameter enlarged portion 61a is disposed between the insulator 6 and the protector 62. Thus, by adjusting the thickness t of the first diameter enlarged portion 61a, an area in which the linear protrusions 6c formed on the first flange portion 6a and the elastic member 61 contact each other is increased or decreased, thereby allowing a desirable frictional force to be generated. That is, by adjusting the thickness t of the first diameter enlarged portion 61a, an amplitude or a frequency generated by vibration of the pad 2 can be arbitrarily adjusted.

As shown in FIG. 2A, the protector 62 protects the elastic member 61 such that the elastic member 61 is not in direct contact with the first horn plate 11. More specifically, the protector 62 is disposed between the first diameter enlarged portion 61a and the second diameter enlarged portion 61b of the elastic member 61. Arrangement of the protector 62 prevents rubbing that would occur between the elastic member 61 and the first horn plate 11 when the dynamic damper vibrates or the horn is sounded, thereby allowing wear on the elastic member 61 to be effectively suppressed.

As shown in FIGS. 6A-6D, the protector 62 generally has a substantially cylindrical flat shape and has a substantially cylindrical barrel portion 62a, a first enlarged portion 62b, and a second enlarged portion 62c. The first enlarged portion 62b is formed at an end of the barrel portion 62a on the first diameter enlarged portion 61a side. The second enlarged portion 62c is formed at the other end of the barrel portion 62a on the second diameter enlarged portion 61b side. An opening 62d is formed in a central portion of the protector 62. The opening 62d allows the barrel portion 61c of the elastic member 61 to be inserted therethrough.

As shown in FIGS. 6A and 6C, the protector 62 has an enlarged portion (first enlarged portion 62b) and the cylindrical protrusions 62e. The enlarged portion (first enlarged portion 62b) is enlarged so that the protector can contact the first diameter enlarged portion 61a. The cylindrical protrusions 62e are arranged vertically on a surface of the enlarged portion (first enlarged portion 62b). The cylindrical protrusions 62e are engageable with the recesses 6g formed in the first flange portion 6a of the insulator 6 and the recesses 61e formed in the first diameter enlarged portion 61a of the elastic member 61. Due to the cylindrical protrusions 62e, rotation of the insulator 6 and the elastic member 61 can be suppressed, thereby allowing wear on the insulator 6 and the elastic member 61 to be suppressed. As shown in FIG. 2A, the cylindrical protrusions 62e are disposed so that the cylindrical protrusions 62e can contact the stopper 5. Thus, even when the elastic member 61 is compressed between the stopper 5 and the first horn plate 11, the cylindrical protrusions 62e come into contact with the stopper 5, thereby preventing an excessive load to be applied to the elastic member 61.

As shown in FIGS. 6A, 6C and 6D, the barrel portion 62a of the protector 62 has claws 62f that can be retained at the first horn plate 11. The first enlarged portion 62b has notches 62g. The claws 62f retained at the first horn plate 11 are visible through the notches 62g from the first enlarged portion 62b side. The notches 62g each have a shape substantially the same as the notch 6h of the insulator 6 and the notch 61f of the elastic member 61. Thus, even when the protector 62 is retained at the first horn plate 11, the claws 62f can be visually checked while not being obscured by the first flange portion 6a, the first diameter enlarged portion 61a, and the first enlarged portion 62b, and accordingly, the assembled state can be easily checked.

As shown in FIGS. 6C and 6D, the claws 62f are formed between the first enlarged portion 62b and the second enlarged portion 62c. The claws 62f can be radially displaced due to elastic force. Two claws 62f are provided at an outer periphery of the barrel portion 62a. However, three or more claws 62f may be provided, and it is sufficient that at least one of the claws 62f be visible. That is, the notches 6h, 61f, and 62g may be formed such that at least one of the claws 62f is visible therethrough.

As shown in FIGS. 6A-6C, a gap of a specified size is formed between the first enlarged portion 62b and the second enlarged portion 62c in the axial direction of the barrel portion 62a. The first horn plate 11 is fitted in this gap. As shown in FIG. 6A, contact portions 62h, which contact the first horn plate 11, may be formed on the second enlarged portion 62c.

As shown in FIG. 2A, the coil spring 7, which is inserted between the insulator 6 and the second horn plate 21, contacts the second flange portion 6b of the insulator 6 so as to urge the insulator 6 in a direction in which the insulator 6 is pressed against the stopper 5. As mentioned before, since the elastic member 61 is engaged with the outer periphery of the insulator 6, and the protector 62 is engaged with the outer periphery of the elastic member 61, the elastic member 61 is not crushed by the urging force of the coil spring 7. Thus, a load applied to the elastic member 61 can be reduced, and the life of the elastic member 61 can be extended. In particular, the insulator 6 is divided into the first insulator 601 and the second insulator 602, and the first leg portions 6d of the first insulator 601 can contact the stopper 5 or the washer 42. Thus, the urging force of the coil spring 7 can be received by the first leg portions 6d, and accordingly, a load applied to the elastic member 61 can be effectively reduced.

As shown in FIG. 2B, in order to sound the horn, the pad 2 is pressed. As a result, the second horn plate 21 is moved in a direction indicated by an arrow in FIG. 2B. At this time, along with the movement of the second horn plate 21, the guide pin 4 is moved inside the insulator 6 in a sliding manner in a direction indicated by the arrow in FIG. 2B because the insulator 6 is retained in one of the openings 111 of the first horn plate 11, which is secured to the main body 1, with the protector 62 therebetween, and the guide pin 4 is secured to the second horn plate 21. When the moving contacts 3b are brought into contact with the fixed contacts 3a shown in FIG. 1, the horn switch 3 is operated so as to generate sound. Even when the horn is sounded, due to the stopper walls 6p being in contact with the protector 62, the insulator 6 (second insulator 602) pressed by the coil spring 7 can reduce a load applied to the elastic member 61.

When the horn is sounded, since the insulator 6 is retained at the first horn plate 11, the guide pin 4 and the stopper 5 moves downward (indicated by the arrow in FIG. 2B) relative to the insulator 6. The distance by which the guide pin 4 and the stopper 5 move is equal to the offset distance K between each fixed contact 3a and a corresponding one of the moving contacts 3b. Thus, a gap, the size of which is equal to the offset distance K between the fixed contact 3a and the moving contact 3b, is formed between the surface of the insulator 6 (first flange portion 6a) and the stopper 5. Although the size of this gap is typically about several millimeters, since the inflator 22b is disposed in the same space R, there is a possibility of the harness 25, which extends from the inflator 22b, getting caught and pinched. In order to suppress the occurrence of such a situation, the wall surface portion 60 is formed at the peripheral edge of the insulator 6 (first flange portion 6a).

Thus, the height Kw of the wall surface portion 60 is, when the washer 42 is not used, equal to the offset distance K between the fixed contact 3a and the moving contact 3b. When the washer 42 is used, the height Kw of the wall surface portion 60 is formed so as to be larger than the offset distance K by the thickness of the washer 42. However, even when there is a small gap formed between the wall surface portion 60 and the stopper 5, the possibility of the harness 25 getting caught and pinched is low in the case where the size of the gap is, for example, about 1 to 2 mm or smaller. That is, it is sufficient that the wall surface portion 60 be formed to have a height with which the harness 25 does not get caught in the gap between the stopper 5 and the insulator 6 and pinched therebetween. Although it is not shown, the wall surface portion 60 may have a plurality of lightening holes each having a size or shape at or with which the harness 25 does not enter the gap between the stopper 5 and the insulator 6. The lightening holes are formed of, for example, slits or cuts having widths of about 1 to 2 mm or smaller.

The height of the wall surface portion 60 is a "height substantially equal to" the offset distance K refers to both the following cases: a case in which the height of the wall surface portion 60 includes an additional dimension in consideration of the thickness of the washer 42; and a case in which there is a gap formed between the wall surface portion 60 and the stopper 5, the gap being a gap having such a size as not to allow the harness 25 to get caught in the gap and pinched between the wall surface portion 60 and the stopper 5.

Figure 7:
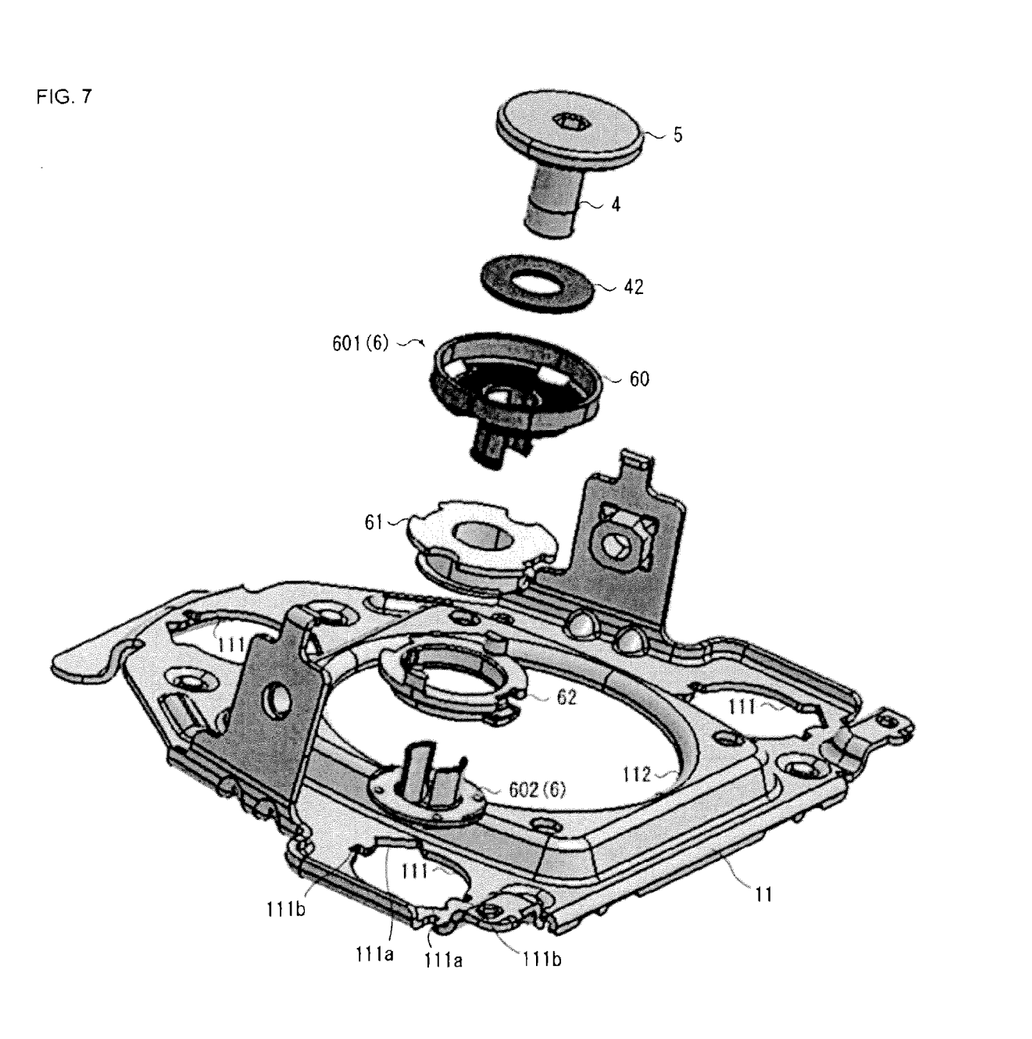
FIG. 7 shows an exploded view of the support structure of the horn switch shown in FIG. 1.

FIG. 7 shows an exploded view of the support structure of one of the horn switches 3 shown in FIG. 1. As shown in FIG. 7, the first horn plate 11 has an opening for an inflator 112 and the openings 111. The opening for an inflator 112, through which the inflator 22b is inserted, is formed at a substantially central portion of the first horn plate 11. The openings 111, in each of which the insulator 6 is retained, are disposed at an outer periphery of the opening for an inflator 112. Although, for example, three openings 111 are formed as shown in FIG. 7, this does not limit the number of openings 111. Each opening 111 has a pair of enlarged portions 111a, through which part of the insulator 6 can be inserted, and notches 111b formed in intermediate portions between the pair of enlarged portions 111a. The numbers and arrangement of the enlarged portions 111a and the notches 111b are set in accordance with the shape of the insulator 6.

As shown in FIG. 7, the support structure of the horn switch 3 includes the first insulator 601 and the second insulator 602, which are parts of the insulator 6, the elastic member 61 and the protector 62, which are held between the components of the insulator 6, the stopper 5 and the guide pin 4 secured to the second horn plate 21, and the washer 42 disposed between the insulator 6 and the stopper 5.

In order to retain an assembly of the insulator 6, the elastic member 61, and the protector 62 in one of the openings 111 of the first horn plate 11, the second enlarged portion 62c of the protector 62 is inserted through the enlarged portion 111a of the opening 111, the assembly (protector 62) is rotated by 90°, thereby retaining the claws 62f of the protector 62 in the notches 111b of the opening 111. At this time, since the insulator 6, the elastic member 61, and the protector 62 of the assembly respectively have their own notches 6h, 61f, and 62g formed therein, the claws 62f retained in the notches 111b can be visually checked. Thus, the assembled state of the assembly can be easily checked.

Figure 8A:
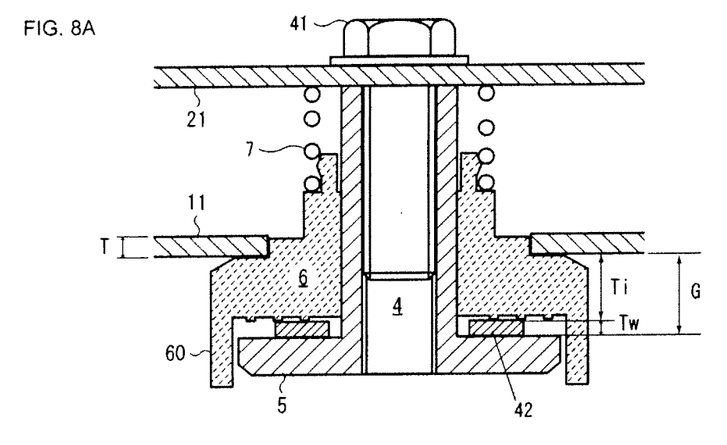
FIG. 8A shows a view of a second embodiment.
Figure 8B:
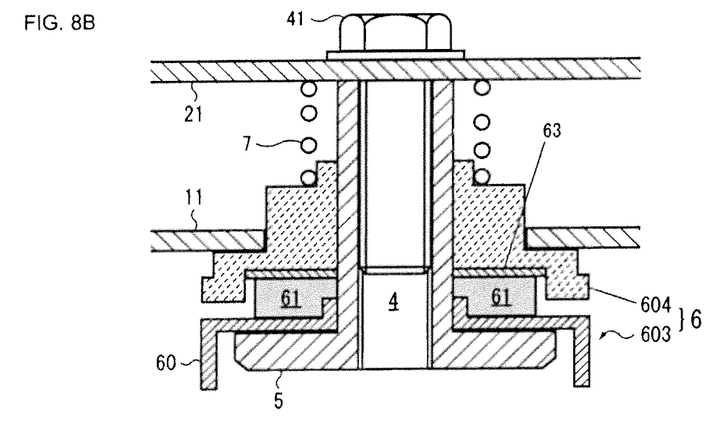
FIG. 8B shows a view of a third embodiment.
Figure 9A:
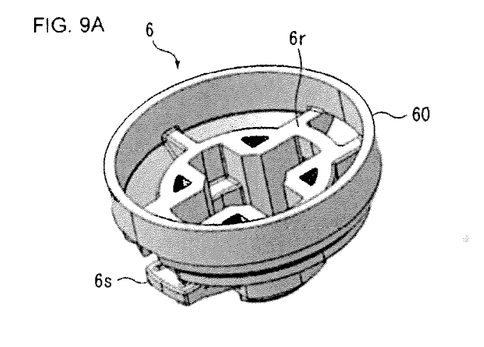
FIG. 9A shows an upper perspective view.
Figure 9B:
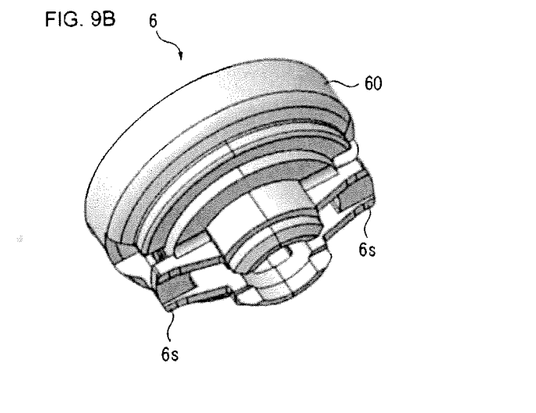
FIG. 9B shows a lower perspective view.
Figure 9C:
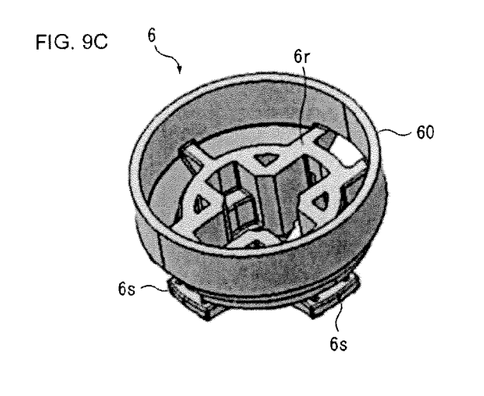
FIG. 9C shows an upper perspective view of a modification.
Figure 9D:
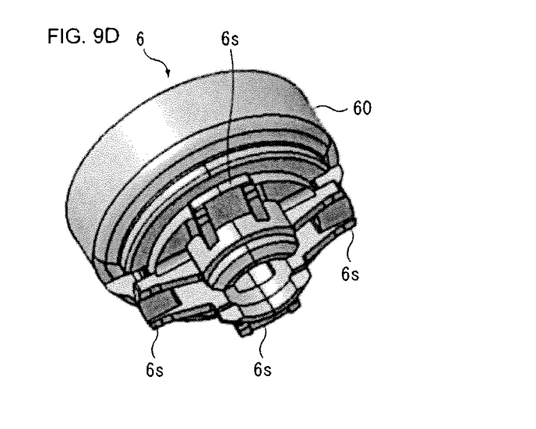
FIG. 9D shows a lower perspective view of the modification.

Next, a steering wheel according to other embodiments of the present invention will be described with reference to FIGS. 8 and 9. FIG. 8 shows enlarged views of parts of the steering wheels according to the other embodiments of the present invention, wherein FIG. 8A shows a view of a second embodiment, and FIG. 8B shows a view of third embodiment. FIG. 9 shows external views of the insulator shown in FIG. 8A, wherein FIG. 9A shows an upper perspective view, FIG. 9B shows a lower perspective view, FIG. 9C shows an upper perspective view of a modification, and FIG. 9D shows a lower perspective view of the modification. The same components as those in the above-described first embodiment are denoted by the same reference numerals and duplicate description is omitted.

As is the case with FIG. 2, FIGS. 8A and 8B illustrate the support structure of the horn switch 3. The entire structure of the steering wheel SW is substantially the same as that shown in FIG. 1. In the second embodiment shown in FIG. 8A and the third embodiment shown in FIG. 8B, the structures of the insulators 6 are different from that of the first embodiment.

In the steering wheel SW according to the second embodiment shown in FIG. 8A, a gap G having a size at least twice the thickness T of the first horn plate 11 is formed between the first horn plate 11 and each of the stoppers 5. Each insulator 6, the entirety of which is formed of synthetic resin as an integral unit, has a thickness Ti with which most of the gap G is occupied.

The thickness Ti of the insulator 6 is set to be a thickness that occupies, for example, 60 to 100% of the gap G. This occupying ratio of the thickness Ti to the gap G can be arbitrarily set in accordance with the size of the gap G and the presence or absence the washer 42. For example, when the size of the gap G is 3 mm, the thickness Tw of the washer 42 is 1 mm, and the thickness Ti of the insulator 6 is 2 mm, the occupying ratio is 66%. When the size of the gap G is 5 mm, the thickness Tw of the washer 42 is 1 mm, and the thickness Ti of the insulator 6 is 4 mm, the occupying ratio is 80%. When the size of the gap G is 5 mm, the thickness Tw of the washer 42 is 2 mm, and the thickness Ti of the insulator 6 is 3 mm, the occupying ratio is 60%. When no washer 42 is inserted, the occupying ratio of the thickness Ti of the insulator 6 is 100%.

In the steering wheel SW according to the third embodiment shown in FIG. 8B, each synthetic-resin insulator 6 used in the second embodiment is changed to an insulator with a damping function having the elastic member 61.

Each insulator 6 with a damping function includes, for example, a substrate 603 to contact the stopper 5, an insulator main body 604 secured to one of the openings 111 formed in the first horn plate 11, the elastic member 61 disposed between the substrate 603 and the insulator main body 604, and a ring plate 63, which is joined to the elastic member 61 and guides a sliding movement. As described above, in the insulator 6 with a damping function, in many cases the elastic member 61 is disposed between vertically divided holding members (substrate 603 and insulator main body 604). It should be understood that the structure of the insulator 6 with a damping function shown in FIG. 8B is only an example, and the structure of the insulator 6 with a damping function is not limited to this.

The insulator 6 according to the second embodiment has substantially the same external shape as that of the insulator 6 with a damping function according to the third embodiment. With such a structure, the synthetic-resin insulator 6 or the insulator 6 with a damping function can be chosen in accordance with application and need, and when these insulators 6 are replaced, only the insulator 6 can be easily replaced without changing other components.

In general, which insulator 6 out of the insulator 6 with a damping function and the insulator 6 without a damping function is used is determined in advance in accordance with individual vehicle types and sales areas, and the structure of the steering wheel SW is designed in accordance with the determination. Thus, there may be a case in which, among the same steering wheels SW, some of the steering wheels SW have the damping function and the other steering wheels SW do not have the damping function. Since the functions of the insulator 6 with a damping function and the insulator 6 without a damping function are different, typically, they are separately designed, use insulators having different shapes, and are surrounded by components having different shapes and the like (for example, the shape of the opening 111 of the first horn plate 11, the shape and tightening amount of the guide pin 4, the shape and spring constant of the coil spring 7, and the like). Thus, for a single vehicle type, the number of components doubles because of the presence or absence of the damping function. In addition, the components demand separate management.

However, when both the insulator 6 according to the second embodiment and the insulator 6 according to the third embodiment having substantially the same external shape are prepared, it is sufficient that only the insulator 6 be replaced in accordance with the presence or absence of the damping function. Accordingly, the number of components and man-hours for management can be decreased, thereby allowing the cost to be reduced.

FIGS. 9A and 9B illustrate an example of the insulator 6 according to the second embodiment shown in FIG. 8A, and FIGS. 9C and 9D illustrate a modification of the example of the insulator 6 according to the second embodiment. The insulator 6 shown in FIGS. 9A and 9B has a surface portion 6r that faces the stopper 5. At the edge of the surface portion 6r, the wall surface portion 60 is formed. The wall surface portion 60 covers the outer periphery of the stopper 5 and has a height Kw substantially equal to the offset distance K between the fixed contact 3a and the moving contact 3b. Lightening holes are appropriately formed in the surface portion 6r in order to reduce the weight of the surface portion 6r. A pair of claws 6s (corresponding to the claws 62f in the first embodiment), which are retained at the first horn plate 11, are formed below the surface portion 6r.

The insulator 6 shown in FIGS. 9C and 9D has the claws 6s at four positions in the peripheral direction. Since the structure except for the claws 6s is the same as that of the insulator shown in FIGS. 9A and 9B, the detailed description is omitted here. With the increased number of claws 6s, the insulator 6 can be stably retained at the first horn plate 11. This can reduce abnormal noise due to deformation of the insulator 6 or the like. The number of claws 6s is not limited to two or four. Three claws 6s or five or more claws 6s may be provided.

It should be understood that the present invention is not limited to the above-described embodiments, and various modifications are possible without departing from the gist of the present invention.

What is claimed is:

1. A steering wheel that includes a main body attached to a steering shaft for converting a rotational operation into a steering operation and a pad disposed in a substantially central portion of the main body, the pad being attached to the main body such that the pad is movable in an axial direction of the steering shaft, the steering wheel including a horn switch being configured between a fixed contact disposed on a main body side and moving contacts disposed on a pad side, the steering wheel comprising:
a first horn plate secured to the main body;
a second horn plate secured to the pad;
a plurality of guide pins, each guide pin arranged vertically on the second horn plate and inserted through an opening of the first horn plate;
a flange-shaped steppers stopper formed on each of the guide pins;
a first and second insulator retained in each opening of the first horn plate and disposed so as to be slidable along a corresponding guide pin;
an elastic member engaged with an outer periphery of each corresponding first and second insulator;
a protector engaged with an outer periphery of each elastic member, each protector retained at the first horn plate; and
a coil spring disposed between the second horn plate and a corresponding second insulator so as to urge each corresponding first and second insulator toward a corresponding stopper;
wherein each first insulator has a wall surface portion that covers an outer periphery of a corresponding stopper and has a height substantially equal to an offset distance between the fixed contact and the moving contact;
wherein each first insulator includes a first flange portion disposed between a corresponding stopper and a corresponding elastic member;
wherein each second insulator includes a second flange portion disposed between a corresponding coil spring and a corresponding elastic member;
wherein each elastic member includes:
a first enlarged portion having a first diameter, the first diameter configured such that the elastic member contacts a corresponding first flange portion; and
a second enlarged portion having a second diameter the second diameter configured such that the elastic member contacts a corresponding second flange portion;
wherein a plurality of linear protrusions are substantially radially formed on a surface of the first flange portion in contact with the first enlarged portion.

2. The steering wheel according to claim 1, wherein the pad includes an airbag device including:
an airbag to be inflated and deployed in an emergency situation;
an inflator for supplying gas to the airbag; and a harness connected to a steering shaft side, a firing signal being transmitted to the inflator through the harness;

wherein the wall surface portion of each first insulator is formed to have a height with which the harness does not get caught in a first gap between the corresponding stopper and the first insulator and pinched therebetween.

3. The steering wheel according to claim 2, wherein each wall surface portion of each first insulator includes a plurality of lightening holes;

wherein a size or shape of each lightening hole is configured to prevent the harness from being received within the first gap between each stopper and first insulator.

4. The steering wheel according to claim 1, wherein the each first insulator having further includes a first leg portion extending from the corresponding first flange portion toward the corresponding second flange portion;

wherein each first leg portion is disposed along a corresponding guide pin;

wherein each second insulator further includes a second leg portion extending from the corresponding second flange portion to the corresponding first flange portion;

wherein each second leg portion is disposed along a corresponding guide pin.

5. The steering wheel according to claim 1, wherein a second gap at least twice as thick as the first horn plate is provided between the first horn plate and each stopper;

wherein each first and second insulator is disposed within a majority of a corresponding second gap;

wherein each of the first and second insulators is formed of synthetic resin as an integral unit.

6. The steering wheel according to claim 5, wherein the second gap is one in which a third insulator with a damping function having an elastic member can be mounted.

7. The steering wheel according to claim 6, wherein the integrally formed first and second insulators and the third insulator have substantially the same external shape.

* * * * *